United States Patent [19]

Okabe et al.

[11] Patent Number: 5,626,788
[45] Date of Patent: May 6, 1997

[54] PRODUCTION OF MAGNETIC OXIDE POWDER

[75] Inventors: Shinsei Okabe, Takatsuki; Yukio Hamaji, Nagaokakyo, both of Japan

[73] Assignee: Murata Manufacturing Co., Ltd., Japan

[21] Appl. No.: 447,933

[22] Filed: May 23, 1995

[30] Foreign Application Priority Data

May 25, 1994 [JP] Japan .................................. 6-111378

[51] Int. Cl.$^6$ .................................................. C04B 33/26
[52] U.S. Cl. ............................ 252/62.6; 252/62.62
[58] Field of Search ........................... 252/62.6, 62.62; 423/594

[56] References Cited

U.S. PATENT DOCUMENTS

| | | | |
|---|---|---|---|
| 4,069,164 | 1/1978 | Dezawa et al. | 252/62.62 |
| 4,125,474 | 11/1978 | Dezawa et al. | 252/62.62 |
| 4,291,010 | 9/1981 | Senda et al. | 423/594 |
| 4,764,300 | 8/1988 | Hibst et al. | 252/62 |

FOREIGN PATENT DOCUMENTS

| | | |
|---|---|---|
| 0203470 | 5/1986 | European Pat. Off. |
| 59-143004 | 12/1984 | Japan . |
| 4-149029 | 9/1992 | Japan . |

OTHER PUBLICATIONS

Patent Abstracts of Japan —vol. 6, No. 65, Apr. 24, 1982.
Patent Abstracts of Japan —vol. 11, No. 322, Oct. 20, 1987.

*Primary Examiner*—Melissa Bonner
*Attorney, Agent, or Firm*—Ostrolenk, Faber, Gerb & Soffen, LLP

[57] ABSTRACT

A powder of magnetic oxides given by the general formula:

$$MeFe_2O_4$$

where Me is at least one element of divalent metal element selected from the group consisting of Ni, Zn, Cu, Mn and Co, is produced by a method comprising the steps of preparing a magnetic oxide precursor composed of α-FeOOH and a complex carbonate compound of at least one divalent metal element deposited on surfaces of particles of α-FeOOH; and then treating the resultant magnetic oxide precursor with heat.

7 Claims, No Drawings

PRODUCTION OF MAGNETIC OXIDE POWDER

BACKGROUND OF THE INVENTION

1. Field of the Invention

The present invention relates to a method for producing magnetic oxide materials which are high in surface activity and suitable for low temperature sintering.

2. Prior Art

Up to now, various methods have been proposed for producing magnetic oxide powders, for example, Ni—Zn ferrite powders. These methods includes (a) a powder-mixing method comprising the steps of mixing carbonates and/or oxides of respective constituents of a Ni—Zn ferrite in given proportions and calcining the resultant mixture at a high temperature to produce a Ni—Zn ferrite powder, (b) an oxalate method including the steps of incorporating an oxalate into a mixed aqueous solution of water-soluble compounds of Ni, Zn and Fe to precipitate their oxalate and calcining the resultant oxalate to produce a Ni—Zn ferrite powder, and (c) a method including the steps of dissolving iron alkoxide, nickel acetylacetonate and zinc acetylacetonate in an organic solvent, adding water to the resultant solution to hydrolyze the alkoxide and acetylacetonate, and calcining the resultant gel to produce a Ni—Zn ferrite powder.

However, these methods have the following respective disadvantages awaiting a solution. For example, the powder-mixing method has the disadvantage that it is impossible to disperse all the ingredients homogeneously on atomic levels because the starting materials are powders of oxides and/or carbonates. Thus, it is necessary to calcine the mixture of the starting materials at temperatures of 700° C. and above to make it spinel. In addition, it is impossible to avoid local deviation of the composition.

Although each starting material may be produced by calcination of fine precipitates prepared by the wet process, the resultant powder is large in particle size and low in activity because of aggregation of particles even if the precipitate is fine particles. The use of such ferrite powder results in the increase in sintering temperature. Further, it is difficult to disperse all the ingredients homogeneously on atomic levels. In addition, it is necessary to make the aggregated particles into finely ground particles, but it adulterates the ferrite powder because of wear of media and inner walls of a mill.

To solve such problems, it has been proposed to incorporate an auxiliary sintering agent into the ferrite powder. This contributes to lower the sintering temperature, but causes lowering of magnetic properties of the ferrite products.

On the other hand, method (b) occasionally produces oxalate of the respective metal ions along with a desired molecular compound because of difference in optimum pH for production of oxalate between the ferrite elements, causing formation of a mixed precipitate, which in turn causes production of heterogeneous ferrite powder. Since the compounds in the mixed precipitate differ from one another in solubility, they differ from one another in elution during washing, resulting in deviation from the composition to be produced.

The above oxalate compounds are then calcined to form them into a spinel compound. This reaction mechanism begins with decomposition of oxalate compounds into carbonates and oxides by release of $CO_2$ or CO from the carboxyl group, which then react with one another in the solid phase. Thus, it is necessary to calcine the compounds at a high temperature, causing adulteration due to pulverization of the ferrite powder. In addition, this oxalate method requires liquid waste treatment including aeration for lowering of B.O.D. or neutralization of acidic solutions.

The method (c) makes it possible to produce magnetic oxide powder which is low in calcination temperature but high in surface activity and purity. However, this method involves the problem that the starting materials to be used are too expensive to mass-produce the magnetic oxide powder.

SUMMARY OF THE INVENTION

It is therefore an object of the present invention to provide a method for producing magnetic oxide powders which are inexpensive, easily sinterable, small in particle size, and high in surface activity.

According to the present invention, the above object is achieved by providing a method for producing a magnetic oxide powders given by the general formula:

$$MeFe_2O_4$$

where Me is at least one element of divalent metals selected from the group consisting of Ni, Zn, Cu, Mn and Co, said method comprising the steps of preparing a magnetic oxide precursor composed of alpha ferric hydroxide ($\alpha$-FeOOH) and a complex carbonate compound of said at least one divalent element deposited on surfaces of particles of said ferric hydroxide; and then treating the resultant magnetic oxide precursor with heat.

In a preferred embodiment, the magnetic oxide precursor is prepared by dispersing alpha-ferric hydroxide powder in a solution containing ions of at least one divalent metal element to prepare a slurry, and introducing carbonic ions or carbonic acid gas into the resultant slurry to deposit a complex carbonate compound on the particle surfaces of the alpha-ferric hydroxide powder.

It is preferred to heat-treat the magnetic oxide precursor at a temperature ranging from 450° to 600° C.

Preferred sources of Me metal ions are water-soluble divalent metal compounds and divalent metal compounds soluble in nitric acid or acetic acid, except those compounds containing halogen ions, sulfuric acid ions or other anions which react with and have adverse effect on electrodes to be formed on sintered ferrite products. Typical water-soluble metal compounds include, without being limited to, nickel nitrate, zinc nitrate, copper nitrate and cobalt nitrate, nickel acetate, zinc acetate, copper acetate and cobalt acetate.

Preferred sources of carbonic ions are at least one carbonate selected from the group consisting of $Na_2CO_3$, $K_2CO_3$ and $Li_2CO_3$.

The magnetic oxide precursor prepared by liquid phase reactions is composed of ferric hydroxide and a complex carbonate compound deposited on the particle surfaces of ferric hydroxide. The complex carbonate compound may be expressed by the general formula: $(Me,Me)_x(OH)_y(CO_3)_z$ where Me is at least one element of divalent metals selected from the group consisting of Ni, Zn, Cu, Mn and Co, and x, y and z are positive integers satisfying $2x=y+2z$.

By the thermal treatment of the precursor, alpha ferric oxide and complex carbonate compound are simultaneously decomposed at temperatures of the order of 300° C. and react with one another to form a magnetic oxide powder with a spinel structure. Thus, it is possible with the present invention to produce magnetic oxide powders by the heat treatment at low temperatures.

Further, the magnetic oxide precursor is produced by depositing a carbonate or complex carbonate compound of one or more divalent metals other than Fe on surfaces of particles of ferric hydroxide ($\alpha$-FeOOH), thus making it possible to cover respective particles of $\alpha$-FeOOH with the carbonate or complex carbonate compound of one or more divalent metal elements other than Fe constituting magnetic oxide.

The solubility product of the carbonate or complex carbonate compound of the divalent metal elements deposited on ferric oxide particles is $10^{-10}$ which is two or three orders in magnitude smaller than the solubility product of the oxalate compounds, $10^{-7}$ to $10^{-8}$, produced by the oxalate method of the prior art. Accordingly, it is possible with the present invention to minimize elution of the divalent metal ions which may occur during a washing operation of the reaction products.

The above and other objects, features and advantages of the present invention will be further explained below, making reference to examples relating to production of a Ni—Zn ferrite powder.

EXAMPLE 1

Starting materials, nickel nitrate, zinc nitrate and $\alpha$-ferric hydroxide were respectively weighed out accurately in accordance with a chemical composition of a Ni—Zn ferrite shown in Table 1.

TABLE 1

| Element | Fe | Ni | Zn |
|---|---|---|---|
| Molar ratio | 1.000 | 0.214 | 0.286 |

The weighed nickel nitrate and zinc nitrate powders were dissolved in pure water and, after adjusting the resultant solution to pH 4–6 with sodium hydroxide, the $\alpha$-ferric hydroxide powder was added to the solution with rapid-stirring to prepare a suspension. The suspension was adjusted to pH 8–9 with sodium carbonate to prepare a ferrite precursor, depositing a complex carbonate of nickel and zinc on particle surfaces of the $\alpha$-ferric hydroxide. The resultant precursor of a Ni—Zn ferrite was filtered off, washed with water several times to remove $Na^+$, dried with a hot air dryer, and then heat-treated at 310° to 700° C. to obtain magnetic oxide powder.

The resultant powder was subjected to X-ray diffraction analysis and magnetization test with a permanent magnet. The results are shown in Table 2.

COMPARATIVE EXAMPLE 1

Ferric oxide ($Fe_2O_3$), nickel oxide (NiO) and zinc oxide (ZnO) were weighed accurately and mixed in accordance with a chemical composition of a Ni—Zn ferrite shown in Table 1, milled with a ball mill, and then heat-treated at 600° to 700° C. The resultant powder was subjected to X-ray diffraction analysis and magnetization test with a permanent magnet in the same manner as Example 1. The results are shown in Table 2.

COMPARATIVE EXAMPLE 2

Nickel nitrate, zinc nitrate, and ferric oxide were respectively weighed out accurately in accordance with a chemical composition of a Ni—Zn ferrite shown in Table 1. Then, nickel nitrate and zinc nitrate powders were dissolved in pure water and, after adjusting the resultant solution to pH 4–6 with sodium hydroxide, ferric oxide ($Fe_2O_3$) was added to the solution with rapid-stirring to prepare a suspension. The resultant suspension was adjusted to pH 8–9 with sodium carbonate with rapid-stirring, depositing a complex carbonate compound of nickel and zinc on particle surfaces thereof. The resultant ferrite precursor was filtered off, washed with water several times to remove $Na^+$, dried with a hot air dryer, and then heat-treated at 310° to 700° C. The resultant powder was subjected to X-ray diffraction analysis and magnetization test with a permanent magnet in the same manner as Example 1. The results are shown in Table 2.

In Table 2, "SP" is an abbreviation of a spinel phase, "OX" is oxide phases of Fe, Ni and Zn, "Yes" in column of magnetization test means that the powder is magnetized by the permanent magnet, while "NO" means that the powder is not magnetized.

TABLE 2

| | Temperature of thermal treatment (°C.) | | | | |
|---|---|---|---|---|---|
| | 310 | 450 | 600 | 700 | Test Item |
| Ex 1 | SP | SP | SP | SP | Crystal phase |
| | NO | YES | YES | YES | Magnetization |
| Com.Ex 1 | — | — | OX | SP | Crystal phase |
| | — | — | NO | YES | Magnetization |
| Com.Ex 2 | OX | OX,SP | OX,SP | SP | Crystal phase |
| | NO | NO | YES | YES | Magnetization |

As will be understood from the results shown in Table 2, it is possible with the method of the present invention to produce magnetic oxide with the spinel structure by heat-treating the precursor at 310° C. In addition, the magnetic oxide become magnetized even when the precursor is heat-treated at a temperature of 450° C. and above. This results from the fact that $\alpha$-FeOOH and a complex carbonate compound, $(Ni,Zn)_x(OH)_y(CO_3)_z$, deposited on particle surfaces thereof decomposes simultaneously at about 300° C. and react with each other to form a magnetic oxide with spinel structure.

In contrast therewith, it is impossible with the powder-mixing method of comparative example 1 to produce spinel compounds unless the mixture is heat-treated at 700° C. and above. Although the method of comparative example 2 makes it possible to produce a spinel compound by heat-treatment of the precursor at 450° C. and above, but it is never magnetized unless heat-treated at 600° C. and above.

As will be understood from the above, the use of the precursor composed of $\alpha$-FeOOH and complex compound of the ferrite constituents, $(Ni,Zn)_x(OH)_y(CO_3)_z$, deposited on particle surfaces of $\alpha$-FeOOH, makes it possible to lower the heat-treating temperature of the precursor to form it into a spinel.

Accordingly, it is possible with the present invention to produce magnetic oxide powders which have small particle size, high surface activity and easy sinterability. Further, the method of the present invention does not require use of expensive raw materials such as alkoxide or acetylacetonate, thus making it possible to produce magnetic oxide powders at a low price. In addition, it does not require aeration or neutralization of the waste solution which is essential for the oxalate method of the prior art to lower the biochemical oxygen demand.

In the above example, nickel nitrate and zinc nitrates were used as the sources of Me ions, but it is to be understood that Me ions sources are never limited thereto, similar results are obtained by combined use of one or more water soluble compounds of Ni, Zn, Cu, Mn and Co.

In the above example, sodium carbonate was used as a source of carbonic acid ions, but similar results were obtained even by the use of carbon dioxide, $K_2CO_3$, or $Li_2CO_3$. Also, similar results were obtained by combined use of two or three carbonates selected from the group consisting of $Na_2CO_3$, $K_2CO_3$ and $Li_2CO_3$.

What is claimed is:

1. A method for producing powder of spinel structure magnetic oxides given by the general formula:

$$MeFe_2O_4$$

where Me is at least one element of divalent metal element selected from the group consisting of Ni, Zn, Cu, Mn and Co, said method comprising the steps of providing a magnetic oxide precursor composed of $\alpha$-FeOOH having a complex carbonate compound of said at least one divalent metal element deposited on surfaces of particles of said ferric hydroxide; and then treating the resultant magnetic oxide precursor with heat at a temperature ranging from 450° to 600° C.

2. The method for producing powder of magnetic oxides according to claim 1, wherein the magnetic oxide precursor is prepared by dispersing alpha-ferric hydroxide powder in a solution containing ions of at least one divalent metal element to prepare a slurry, and introducing carbonic ions or carbonic acid gas into the resultant slurry to deposit a complex carbonate compound on the particle surfaces of the alpha-ferric hydroxide powder.

3. The method for producing powder of magnetic oxides according to claim 2, wherein sources of Me metal ions are selected from the group consisting of water-soluble divalent metal compounds and divalent metal compounds soluble in nitric acid or acetic acid.

4. The method for producing powder of magnetic oxides according to claim 3, wherein sources of carbonic ions are at least one carbonate selected from the group consisting of $Na_2CO_3$, $K_2CO_3$ and $Li_2CO_3$.

5. A method for producing powder of spinel structure magnetic oxides given by the general formula:

$$MeFe_2O_4$$

where Me is at least one element of divalent metal element selected from the group consisting of Ni, Zn, Cu, Mn and Co, said method comprising the steps of providing a magnetic oxide precursor composed of $\alpha$-FeOOH having a complex carbonate compound of said at least one divalent metal element deposited on surfaces of particles of said ferric hydroxide; and then treating the resultant magnetic oxide precursor with heat wherein the magnetic oxide precursor is prepared by dispersing alpha-ferric hydroxide powder in a solution containing ions of at least one said divalent metal element to prepare a slurry, and introducing carbonic ions or carbonic acid gas into the resultant slurry to deposit a complex carbonate compound on the particle surfaces of the alpha-ferric hydroxide powder;

wherein sources of Me metal ions are selected from the group consisting of water-soluble divalent metal compounds and divalent metal compounds soluble in nitric acid or acetic acid;

wherein sources of carbonic ions are at least one carbonate selected from the group consisting of $Na_2CO_3$, $K_2CO_3$ and $Li_2CO_3$ and wherein the magnetic oxide precursor is heat treated at a temperature ranging from 450° to 600° C.

6. The method for producing powder of magnetic oxides according to claim 2, wherein sources of carbonic ions are at least one carbonate selected from the group consisting of $Na_2CO_3$, $K_2CO_3$ and $Li_2CO_3$.

7. A method of producing a nickel-zinc ferrite of spinel structure comprising the steps of dispersing alpha-ferric hydroxide powder in a solution having dissolved therein water soluble compounds of nickel and zinc soluble in nitric acid or acetic acid to form a slurry, introducing carbonic ions or carbonic acid gas into said slurry to deposit a nickel-zinc complex carbonate compound on the particle surface of the alpha-ferric hydroxide powder, and then heating the resulting particles where the water soluble compounds are nitrates, the source of carbonic ions is at least one carbonate selected from the group consisting of sodium carbonate, potassium carbonate and lithium carbonate and the heating is to a temperature from 450°–600° C.

* * * * *